United States Patent [19]
Fiorletta et al.

[11] Patent Number: 5,717,135
[45] Date of Patent: Feb. 10, 1998

[54] TIRE PRESSURE MONITORING SYSTEM UTILIZING A PRESSURE ACTIVATED TRANSDUCER AND SENSOR

[75] Inventors: Carl A. Fiorletta, 4600 Versailles La., Plano, Tex. 75093; Morgan H. Dunn, Carrollton; Cletus F. Nurre, Flower Mound, both of Tex.

[73] Assignee: Carl A. Fiorletta, Plano, Tex.

[21] Appl. No.: 196,416

[22] Filed: Feb. 15, 1994

Related U.S. Application Data

[63] Continuation-in-part of Ser. No. 769,937, Sep. 30, 1991, Pat. No. 5,289,160.

[51] Int. Cl.$^6$ ............................................. B60C 23/02
[52] U.S. Cl. ............................................. 73/146.5; 340/447
[58] Field of Search .................................. 73/146.5, 728, 73/861.74; 310/67 A; 340/58, 445, 447

[56] References Cited

U.S. PATENT DOCUMENTS

| | | | |
|---|---|---|---|
| 4,067,235 | 1/1978 | Markland et al. | 340/447 |
| 4,163,208 | 7/1979 | Merz | 340/58 |
| 4,229,728 | 10/1980 | Tremba | 73/146.5 |
| 4,300,120 | 11/1981 | Surman | 340/58 |
| 4,609,905 | 9/1986 | Uzzo | 340/447 |
| 4,695,823 | 9/1987 | Vernon | 340/449 |
| 4,768,375 | 9/1988 | Eckardt et al. | 73/146.5 |
| 4,783,993 | 11/1988 | Lothar et al. | 73/146.5 |
| 4,816,802 | 3/1989 | Doenksen et al. | 340/447 |
| 4,866,982 | 9/1989 | Gault | 73/146.5 |
| 4,890,090 | 12/1989 | Ballyns | 340/442 |
| 4,894,639 | 1/1990 | Schmierer | 340/444 |
| 4,954,677 | 9/1990 | Alberter et al. | 200/834 |
| 4,978,941 | 12/1990 | Brown | 340/442 |
| 4,980,680 | 12/1990 | Knoll et al. | 340/825.31 |
| 5,055,826 | 10/1991 | Ballyns | 340/442 |
| 5,083,457 | 1/1992 | Schultz | 340/445 |
| 5,279,163 | 1/1994 | D'Antonio et al. | 73/728 |

FOREIGN PATENT DOCUMENTS

| | | | |
|---|---|---|---|
| 2197404 | 8/1990 | Japan | 340/442 |
| 2197405 | 8/1990 | Japan | 340/442 |
| 2171233 | 8/1986 | United Kingdom | 340/447 |

OTHER PUBLICATIONS

United Instrument, Inc., Advertisement, Date Unknown.
R.F. Monolithics, Surface Acoustic Wave Workshop Handbook (Selected pages) Date–1988.
R.F. Monolithics, Demonstration Transmitter, Date–1989.

*Primary Examiner*—Richard Chilcot
*Assistant Examiner*—William L. Oen
*Attorney, Agent, or Firm*—L. Dan Tucker

[57] ABSTRACT

A wireless tire pressure monitoring system is disclosed to warn a driver of a vehicle of low pressure in a vehicle tire. The monitoring system includes a transducer to which wires or other physical connections cannot be easily made. The transducer is attached to a wheel rim and a magnetic field can be selectively produced by elements of the transducer in response to changes in tire pressure. A sensor is mounted for sensing the magnetic field with the sensor producing an output that can be coupled with a monitor in the vehicle cab.

8 Claims, 11 Drawing Sheets

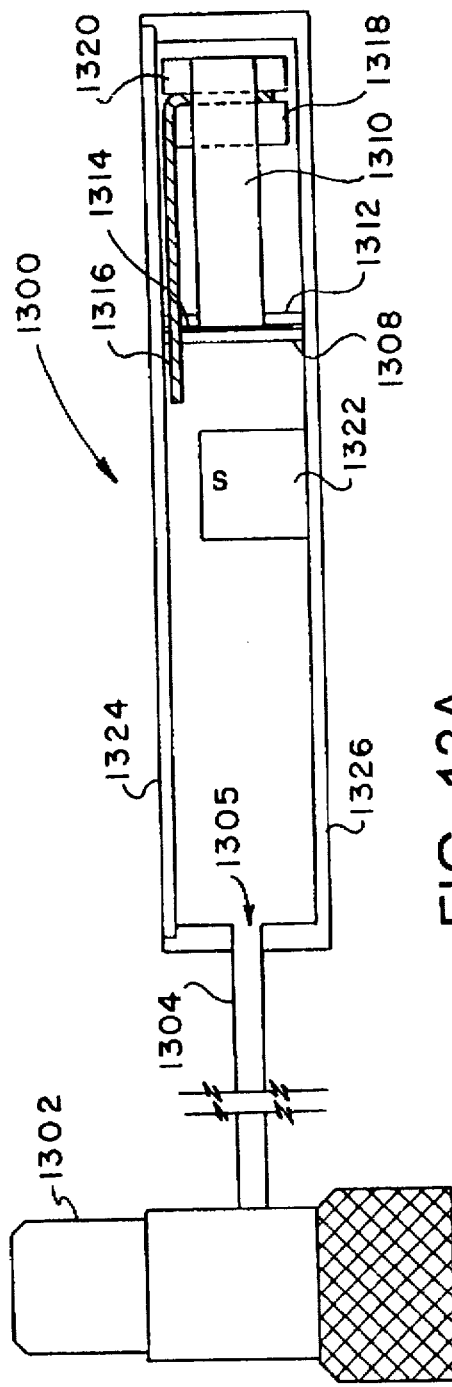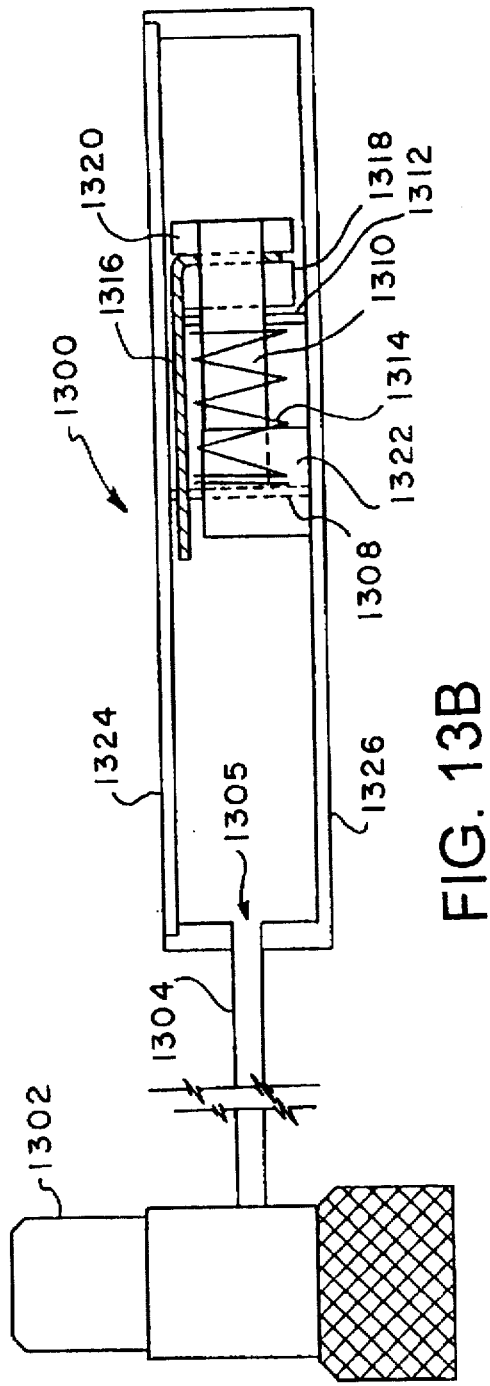
FIG. 13A
FIG. 13B

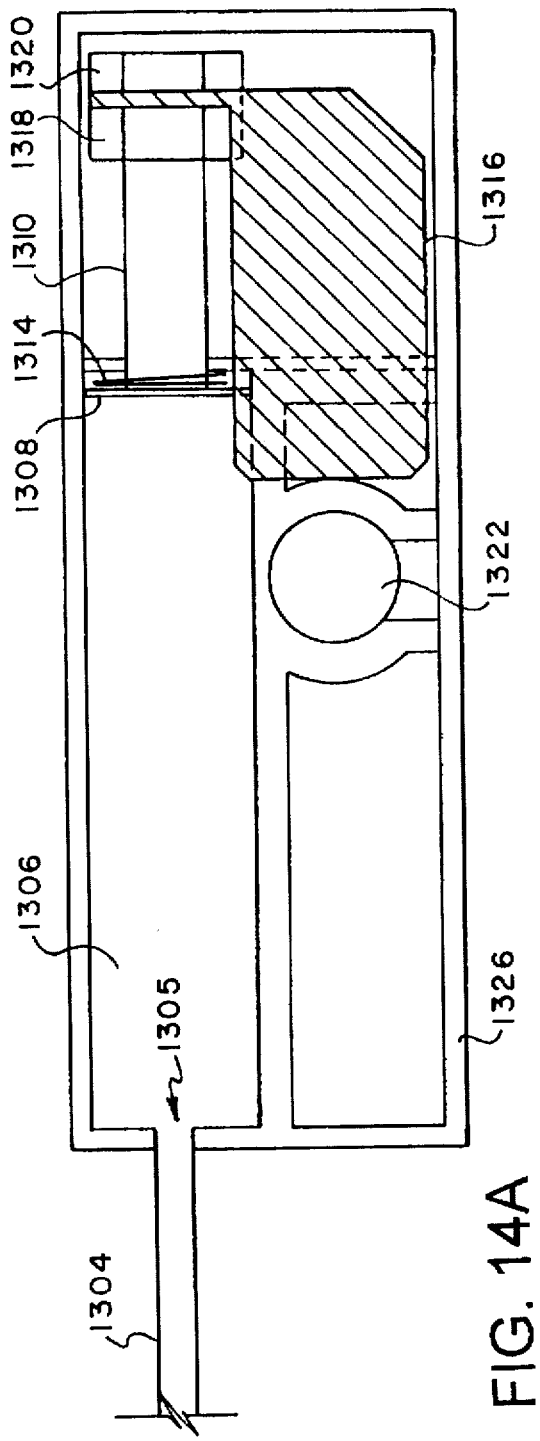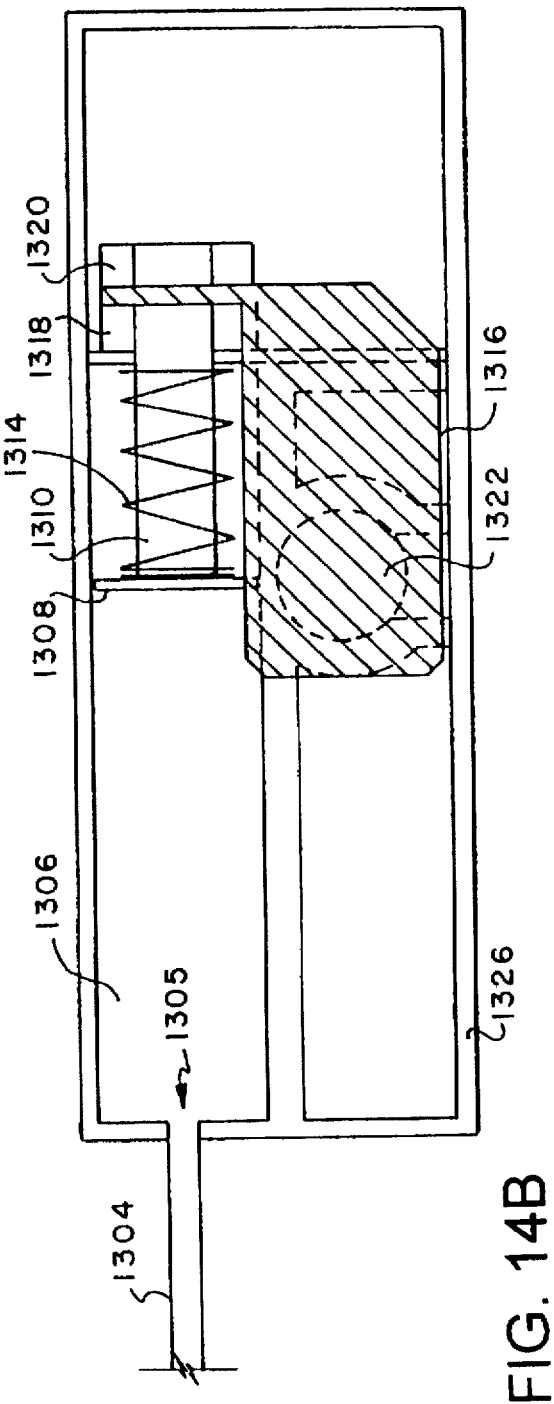

5,717,135

TIRE PRESSURE MONITORING SYSTEM UTILIZING A PRESSURE ACTIVATED TRANSDUCER AND SENSOR

This is a continuation-in-part of application Ser. No. 07/769,937 filed Sep. 30, 1991 now U.S. Pat. No. 5,289,160.

FIELD OF INVENTION

The invention pertains to systems for continually monitoring tire pressure for a vehicle that is at rest or travelling at any speed and sounding an alarm at the driver's instrument panel when the air pressure of a tire falls below a preset minimum pressure level.

BACKGROUND OF THE INVENTION

Many vehicles have one or more tires that may deflate or go completely flat during travel without the driver being immediately aware of the condition. These include tractor-trailer combinations, motor homes, buses and various types of vehicles and trailers being towed that have axles mounted with two or more tires, or tandem rear axles that may have a total of four, six or eight tires. Unlike those of motorcars, drivers of these vehicles cannot sense that a tire has low pressure or suffered a blowout. The large size and heavy weight of these vehicles isolate a driver from noise and vibration created by a blowout. Likewise, a driver towing another vehicle is insulated from any sensation of a deflating or flat tire on the towed vehicle.

Low tire pressure can often lead to a blowout of the tire if it goes undetected. While traveling on an interstate highway at speeds of between 55 and 65 m.p.h., a blowout can cause extensive damage, especially when it goes undetected. The tire disintegrates and its debris damages the vehicle or trailer, often extensively. The wheel hits against the pavement, and usually suffers damage. In the case of dual rear wheels, where there is four wheels per axle, continued motion with one of the tires deflated may even cause the deflated tire to catch fire. There have been cases reported in which such a fire has caused total loss of the vehicle or trailer. Most disconcerting about a loss of pressure or low pressure in a vehicle's tire is, however, that it affects the load carrying capability, steering, breaking and overall control of the vehicle. Loss of a load bearing tire may result in a driver losing control and causing damage to the vehicle, passengers and other property and passengers of other vehicles.

Needless to say, the continual prospect of suffering a blown tire makes drivers of buses, motorhomes, tractors and other large or towing vehicles very uneasy.

Because a tire with abnormally low pressure is a candidate for a blowout, a system which monitors all the tires and provides early warning of an abnormally low pressure would go a long way toward providing peace of mind to the drivers, as well as provide improved safety, prolong the life of tires, prevent tire destruction and fires, and save time. However, though instrument panels in vehicles are over-populated by gauges and lights for providing all sorts of warning, most vehicles do not have a tire pressure monitor that drivers who spend a lot of time on the road desperately want and need. In addition to the failure to recognize the importance of detecting at an early stage low tire pressure to prevent blowouts, there is at least one other reason for the absence of tire pressure monitoring systems: prior art tire pressure monitors have adopted expensive and impractical approaches to this problem.

In the art, there are several examples of tire pressure monitors and alarm systems. These are typically fastened to the rim of the wheel and require that a hole be drilled through the wheel. See U.S. Pat. No. 4,954,677 of Alberter et al.; U.S. Pat. No. 4,894,639 of Schmierer; U.S. Pat. No. 4,866,982 of Gault; U.S. Pat. No. 4,768,375 of Echardt et al.; and U.S. Pat. No. 4,784,993 of Lothar et al. These systems include a transducer of some sort that converts the pressure to a signal for communicating the pressure to a remote display.

The disadvantage of these tire pressure monitors is that the transducers are mounted through the wheel rim. Thus, the wheel must be either specially manufactured or adapted (if possible) with holes that are drilled in the wheel to receive the transducers. As holes cause undue stress on the wheel retrofitting preexisting wheels, it gives rise to safety and liability problems. Thus, they must be manufactured for these systems as original equipment. However, they must meet strict Department of Transportation guidelines and undergo stress tests before approval.

These systems also require that the wheel be removed from the vehicle and disassembled to gain access to the transducers for service. Furthermore, they require some sort of electrical connection between the transducer and any remote monitoring device. With a rotating wheel, this electrical connection requires special contacts, complicating the system, introducing added cost and reducing reliability.

The problem of connecting the transducer to a monitor has been solved in part by radio frequency communications. As shown in U.S. Pat. No. 4,890,090 of Ballyns, a pressure transducer is coupled to a radio frequency transmitter that is mounted within the tire and secured to the wheel rim. Although it has the advantage of wireless communication of the pressure to a remotely placed monitor, it suffers from the same disadvantages of the rim mounted transducers: it is difficult to install and service, and requires special adaption of the wheel.

To avoid this communication problem, it is possible to indirectly monitor the condition of the tire using tire rotation sensors like those installed as original equipment on vehicles with anti-lock braking and some all-wheel drive systems. To detect a deflating tire, these sensors are monitored for abnormal changes in rotation speeds of the tire indicating deflation. Doing so requires sophisticated sensors, data processing equipment and algorithms, and a vehicle originally equipped with this advanced and expensive technology. It is a sophisticated approach, but one that is not feasible for most vehicles such as buses, trucks and motor homes currently being manufactured and on the road that are not using this technology.

Another approach avoids altogether mounting transducers on a tire. Yet it is just as complicated and expensive. An elaborate, and extremely expensive air pressure line is built into the car that runs from a wheel, through a hub and down an axle to a sensor located within the vehicle. This approach is generally available only to the most sophisticated and expensive vehicles and must be installed as original equipment.

Despite previous substantial efforts to improve the safety of tires, current tire pressure monitoring systems continue to run in the vein of being expensive and elaborate; they require substantial modification to wheels and to the car for their use; and they offer methods having little to no feasibility for retrofitting the millions of ordinary wheels that are in use and will continue to be manufactured and used.

SUMMARY OF THE INVENTION

The invention overcomes the aforementioned and other disadvantages of prior art systems and provides for an elegantly simple, low cost, reliable and easily repairable system for warning a driver of an abnormally low pressure in a tire and preventing unexpected tire blowouts. It is designed to be added or retrofitted to tires of existing vehicles such as busses, motor homes, trucks and trailers.

The major components of the system are a pressure sensing device, a hall effect sensor, and a control box. In a preferred embodiment, the pressure sensing device consists of a fixed magnet, a pneumatic cylinder and a steel flag in a common housing. The pneumatic cylinder is pressurized by the pressure of the tire being monitored through a small capillary tube attached to the pneumatic cylinder on one end and to an extension of the tire's valve stem on the other. The steel flag is attached to the piston rod of the pneumatic cylinder and moves with the stroke of the piston. The flag is arranged relative to the magnet so that the flag covers the magnet at a preset low pressure condition and exposes the magnet at a preset high pressure condition. The unit is then simply screwed onto a standard tire stem. Installation and service is thus very simple and the device fits almost every type of tire and thus can be used with almost any type of vehicle. No alterations to the wheel or difficult installation procedures are required. The hall effect sensor in the preferred embodiment is mounted to a fixed member near the wheel so that it is within sensing distance of the magnet inside the pressure sensing device housing. When the steel flag is not coveting the magnet, indicating a high pressure condition, the hall effect sensor will detect the magnetic field and send the appropriate electrical signal to the control box. When the magnet is covered by the steel flag, the hall effect sensor will not detect the magnetic field. The hall effect sensor is connected to the control box by wires which are routed from each wheel to the control box.

The control box in the preferred embodiment receives the electrical signals from each wheel and determines if any of the wheels is showing a low pressure condition. If a low pressure condition exists, the control box will alert the driver of the condition.

In one form of the invention, a wireless monitoring system for indicating the occurrence of a predefined condition with a transducer to which wires and other physical connections cannot be easily made is disclosed, the monitoring system comprising transducer means for sensing an occurrence of a predefined condition, means for selectively producing a magnetic field coupled to the transducer and operable to emit a magnetic field when the transducer is in a first state and further operable to not emit a magnetic field when the transducer is in a second state and means for sensing a magnetic field positioned so as to be in at least occasional proximity to the means for selectively producing a magnetic field, the means for sensing a magnetic field producing an output only when the magnetic field is present.

In another form of the invention, a tire pressure monitoring system for warning a driver of a vehicle when pressure in a tire falls below a predetermined pressure level is disclosed, comprising a pressure chamber having a pneumatic inlet, means for mechanically securing the pressure chamber to an inside rim of a wheel carrying the tire and mounted to an axle of the vehicle, the means for mechanically securing including air passage means for communicating pneumatic pressure from a stem of the tire to the pneumatic inlet, a piston slidingly engaged in the pressure chamber and operable to move within the pressure chamber in response to an increase of the pneumatic pressure, a rod having a first end coupled to one side of the piston, the rod sealingly engaged with the pressure chamber and operable to extend into and out of the pressure chamber, biasing means coupled to a second end of the rod and operable to extend the rod into the pressure chamber when a biasing force of the biasing means is greater than a force on the piston created by the pneumatic pressure, a permanent magnet disposed in proximity to the pressure chamber; the magnet producing a magnetic field, a Hall effect sensor mounted on the axle and operable to sense the magnetic field and produce an output when the permanent magnet is in substantially close proximity thereto, magnetic shield means coupled to the rod and operable to selectively deflect the magnetic field away from the Hall effect sensor when the pneumatic pressure is below the predetermined pressure and to leave the magnetic field substantially unaffected when the pneumatic pressure is above the predetermined pressure and indicator means operable to alert the driver based upon the output. In another form of the invention, a method for detecting a fault in one of a pair of devices is disclosed, comprising the steps of (a) producing a first output pulse periodically while there is no fault in a first device of the pair; (b) producing a second output pulse periodically while there is no fault in a second device of the pair, wherein a first period of the first output is substantially equal to a second period of the second output; (c) producing a first fault detect pulse when two second output pulses are produced without the first output pulse being produced between the two second output pulses; (d) producing a second fault detect pulse when two first output pulses are produced without the second output pulse being produced between the two first output pulses; (e) accumulating the first fault detect pulses in a field fault detect accumulator; (f) accumulating the second fault detect pulses in a second fault detect accumulator; and (g) indicating a fault when the first or second fault detect accumulator has accumulated a predetermined number of respective fault detect pulses.

These and other advantages, objects and aspects of the invention are exemplified by the preferred embodiments of the invention shown in the accompanying drawings. Following is a description of the preferred embodiments, made with reference to the drawings, for enabling one of ordinary skill in the art to practice the best mode of the invention.

BRIEF DESCRIPTION OF THE DRAWINGS

FIGS. 13A-B are cross-sectional side views of a hall effect pressure sensing device for a low tire pressure monitoring system.

FIGS. 14A-B are top views of the hall effect pressure sensing device of FIGS. 13A-B.

DETAILED DESCRIPTION OF THE DRAWINGS

Figure 1:
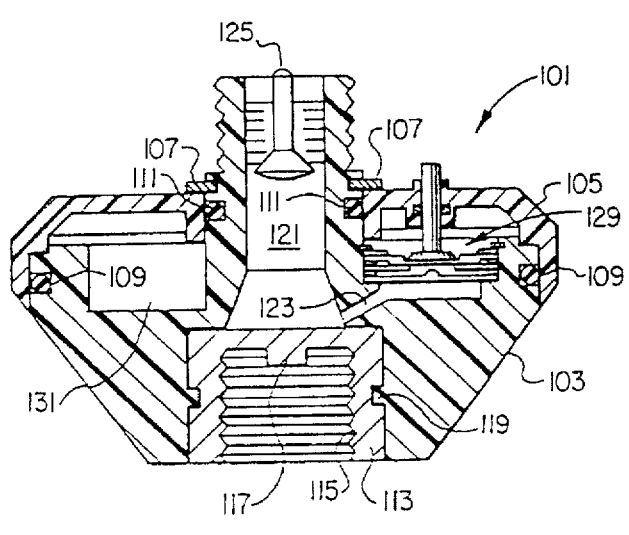
FIG. 1 is a cross-sectional side view of an integrated sensor/transmitter assembly for a low tire pressure monitoring system.

Referring to FIG. 1, integrated sensor and transmitter assembly 101 is a major component of the preferred embodiment of the tire pressure warning system. The integrated sensor and transmitter assembly 101 has housing comprised of a body 103 fabricated from glass filled ABS plastic and a cover 105 made from ABS plastic. The cover 105 is securely fitted to the body 103 by use of retainer ring 107. Two "O" ring seals 109 and 111 provide a water-resistant seal between the body 103 and the cover 105.

A brass insert coupler 113 is molded into the body 103 for coupling the integrated sensor/transmitter to a Shrader valve of a tire stem (not shown). It has a threaded bore 115 and tongue 117 for depressing a valve core of a Shrader valve. Brass insert 113 screws onto the outside threaded end of a tire stem (not shown). The brass insert 113 is secured within the body 103 by use of a molded-end flange 119 that fits within a groove circumscribing the brass insert 113. The threaded bore 115 of the brass insert 113 secures the integrated sensor and transmitter assembly 101 to a tire stem. When the integrated sensor and transmitter assembly 101 is screwed onto a Shrader valve of a tire stem, valve core pressure release 117 depresses the valve core of the Shrader valve, thereby releasing pressurized air into tire stem extension cavity 121 and air line 123.

A second Shrader valve 125 is screwed into a tire stem extension portion 127 of body 103 and seals the tire stem extension cavity. The second Shrader valve and the tire stem extension provide the ability to check tire pressure with a manual tire pressure gauge or to fill the tire with air without removing the integrated sensor and transmitter assembly. So that a cap can be screwed onto the tire stem extension, its exterior surface is threaded.

The air line 123 terminates at a pocket defined within body 103 for receiving pressure sensor assembly 129. The pressure sensor 129 fits snugly within the pocket and seals it. When air line 123 is pressurized from air in a tire, the sensor accurately measures the pressure of air in the tire.

The pressure sensor 129 is mounted in a plane oriented perpendicularly to the tire stem. This reduces the overall height of the integrated sensor and transmitter assembly, as compared to one having a pressure sensor mounted parallel to the stem. In this configuration, the integrated pressure sensor and transmitter assembly must be attached to a Shrader valve of a tire stem, when the wheel rotates, that travels within a plane perpendicular to the ground. Otherwise, centrifugal force generated by a rotating tire will act against the diaphragm, causing inaccurate pressure readings.

The body 103 also includes an electronics cavity 131 integrally formed within the body and enclosed by cover 105. For purposes of illustration, it is shown without any electronics. The electronics that are placed within the cavity 131 are coupled to the pressure sensor assembly 129 for transmitting a signal indicative of an abnormally low pressure sensed by the pressure sensor 129. The area between the cover 105 and the body 103, including the electronics cavity, is open to the pressure sensor, and therefore the pressure of air within the area serves as a reference pressure for the pressure sensor 129. To accurately measure tire pressure, the pressure within the area should be maintained at ambient pressure. No means are provided for ensuring an ambient pressure is maintained within this area. However, because only abnormally low tire pressures need to be sensed, and because it is unlikely that the pressure will deviate substantially from the ambient pressure, a non-ambient pressure within the area will generally not detrimentally affect the pressure sensor's performance for this purpose in most cases.

The dimensions of the integrated sensor and transmitter assembly 101 are very small, approximately 1.064 inches in diameter by 0.76 inches high. The ABS plastic body 103 and cover 105 are very light weight and are of minimal height. The integrated sensor and transmitter assembly 101 therefore may be sufficiently secured to a tire stem sufficiently to prevent it from being thrown off during movement and rotation of the tire by simply screwing it onto the stem.

Figure 2:
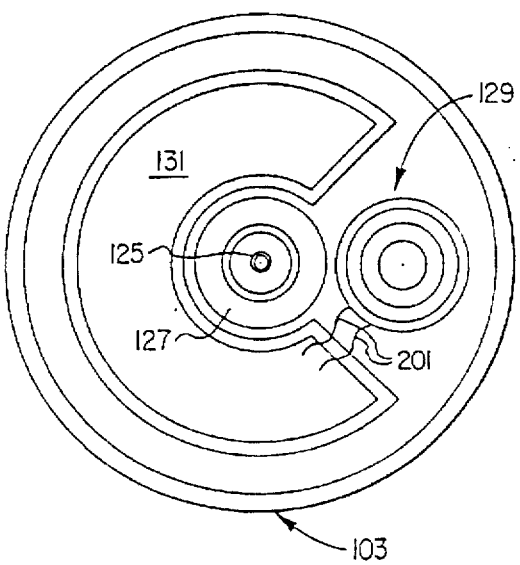
FIG. 2 is a top view of a body of a housing, with its cover removed, for the integrated sensor/transmitter assembly shown in FIG. 1.

Referring now to FIG. 2, a top view of body 103, with cover 105 removed, shows electronics cavity 131 and pressure sensor assembly 129. The pressure sensor assembly 129 is mounted within an integrally formed circular opening to air passage 123 in body 103 shape. The pressure sensor assembly is electrically coupled to electronics circuitry (not shown) mounted within the electronics cavity 131 by leads 201.

Cavity 131 is large enough to accommodate the electronics and any antennas (not shown) required to transmit a signal from the integrated sensor and transmitter assembly 101 to an antennae mounted within a vehicle for receiving a signal. In order to provide cavity 131 with a volume large enough to accommodate electronics and antennas while keeping the diameter and height of body 103 as small as possible, the electronics cavity 131 wraps around, in a circular fashion, tire stem extension portion 127 of body 103. Keeping the size of the base small also reduces the weight of the integrated sensor and transmitter assembly 101 (FIG. 1).

Figure 3:
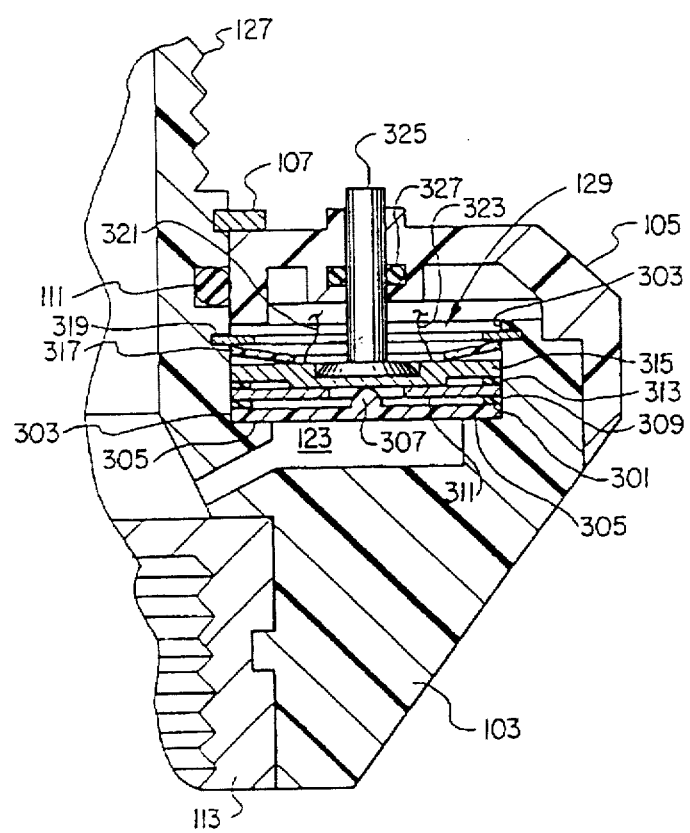
FIG. 3 is a detailed cross-sectional drawing of a pressure sensor switch mounted in the integrated sensor/transmitter assembly of FIG. 1 for use with an active transmitter.

Referring now to FIG. 3, illustrating in detail the cross-section of the pressure sensor assembly 129 in FIG. 1, diaphragm 301 sets snugly within the circular opening 303 of body 103 and rests on annular-shaped ledge 305. The diaphragm is constructed from ABS plastic. Air under pressure within air passage 123 acts against an underside surface of the diaphragm. The pressure tends to deflect upwardly in the diaphragm, causing a nub 307 integrally molded into an upper surface of the diaphragm to be displaced linearly and upwardly when the pressure sensor is assembled to hold the diaphragm in place around its circumferential edges.

Partially overlaying diaphragm 301 is a first annular-shaped spacer 309 that separates diaphragm 301 from lower metal contact 311. The lower metal contact is annularly shaped, having a hole defined within its center through which nub 307 passes. A second annularly-shaped spacer 313 partially overlays lower metal contact 311 to space the contact apart from an upper metal contact 315. The upper metal contact has a "U" shaped depression that extends downwardly within the opening defined by second annularly-shaped spacer 313 to make contact with the lower metal contact 311.

A wave washer 317 cooperates with retainer ring 319 to apply a downward force to a top side of lower metal contact 311. The retainer ring 319, the waver washer 317 and the ledge 305 cooperate to hold together the pressure sensor assembly 129. Wave washer 317 further acts as a spring, exerting a downward force when compressed between an upwardly displaced upper metal contact and the retainer ring 319.

When assembled, the diaphragm 301, nub 307, first and second spacers 309 and 313 and waver washer 317 function as a pressure switch that is normally closed, but open under normal tire pressures. When air pressure within air line 123 is greater than a first predetermined value, the pressure displaces the diaphragm 301. The nub 307 on the diaphragm thereby moves upwardly and linearly, making contact with upper metal contact 315 and displacing it upwardly so that it is no longer in contact with lower metal contact 311. Movement of the upper metal contact compresses the wave washer 317, creating an oppositely acting force to balance the force of the air pressure and stop movement of the diaphragm. When the air pressure falls below the predetermined pressure, the force applied by the compressed wave washer 317 moves the upper contact downwardly to meet with the lower metal contact 311. Upper and lower contacts 315 and 311 are essentially a switch that is opened and closed by the movement of diaphragm 301 in response to the pressure of the air within passage 123.

A lead is attached to each metal contact for connecting the pressure sensor to transmitter circuitry. Lead 321 is attached to the upper surface of upper metal contact 315. Though it is not shown, lead 323 is attached to the upper surface of lower metal contact 311 and passed through an opening defined within upper metal contact 315.

To test the integrated sensor and transmitter assembly when it is mounted to a tire stem and the air pressure in the tire is normal, a "push-to-test" button 325 is provided. The button is mounted through an opening defined in the cover 105. An "O"-ring seal 327 seals the opening.

Figure 3A:
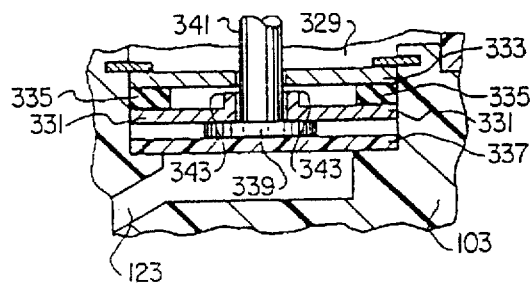
FIG. 3A is a detailed cross-sectional drawing of a pressure sensor for use in connection with a passive transmitter/receiver and in place of the pressure sensor illustrated in FIG. 3.

Referring now to FIG. 3A, pressure sensor 329 replaces the pressure sensor 129 shown in FIGS. 1 and 3. Pressure sensor 329 does not function or operate like pressure sensor 129. Instead, metallic contacts 331 and 333, separated by insulating spacer ring 335, remain normally opened. Pressure greater than a preselected level of the air within air line 123 acts against diaphragm 337, causing it to flex upward and push against disc-shaped portion 339 of "push-to-test" button 341. The button is thereby displaced. When displaced, button 341 acts against lower contact 331, flexing it and displacing its annular-shaped raised ridge portion 343 so that it makes contact with the upper contact disc. Lower contact 331 is a spring disc and generates a force tending to open the contacts so that the contacts are open when pressure acting against the diaphragm falls below a preselected level.

Figure 4:
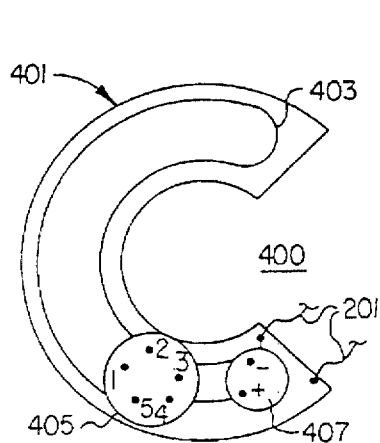
FIG. 4 is a top view of an active transmitter assembly for use in the integrated sensor/transmitter assembly of FIG. 1.

Referring now to FIG. 4, an active transmitter circuit 400 for transmitting air pressure information from pressure sensor 129 is shown that will be inserted into the electronics cavity 131 (FIGS. 1 and 2) of the integrated sensor and transmitter assembly 101. The transmitter circuit included a printed circuit board (PCB) 401 that is shaped to snugly fit within the electronics cavity 131. A metallic loop antenna 403 is "printed" onto the PCB for transmitting radio frequency (RF) signals. Mounted to the board is a microtransmitter 405, such as a RFM-MX Series microtransmitter manufactured by RF Monolithits, Inc. of Dallas, Tex. The microtransmitter has five inputs/outputs: an RF output 1, a modulation input 2, a power control input 3, a direct current power supply input 4, and a ground 5.

Power is supplied by a suitable, long-life battery 407. The battery power supply input is connected to the positive terminal of the battery 407. A switchable power supply circuit is created by connecting the negative terminal of the battery to one of the two leads 201 from the pressure sensor 129, and connecting the other lead to the ground pin of the microtransmitter 405. When the pressure sensor 129 senses a normal pressure within a tire, the contacts within the pressure sensor are opened, thereby opening the power supply circuit and disabling the microtransmitter. When the pressure falls below a preselected, abnormal pressure level, the contacts within the pressure sensor to close (see FIG. 3) power is supplied to the microtransmitter. The microtransmitter then begins to transmit a radio frequency signal.

The RF output of the microtransmitter is connected to the loop antenna in a manner described by the manufacturer of the microtransmitter. If desired, the RF output can be modulated with an identifying code by a signal provided by additional circuitry (not shown) to the modulating signal input. Appropriate circuitry (not shown), as specified by the manufacturer of the microtransmitter, is provided on the PCB for setting the power of the RF output with the power control input.

Figure 5:
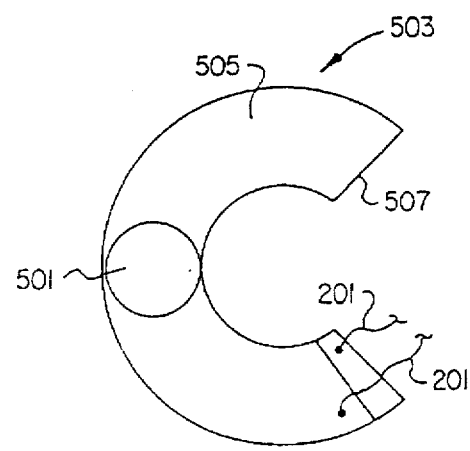
FIG. 5 is a top view of a passive transmitter/receiver assembly for use in the integrated sensor/transmitter assembly of FIG. 1.

Referring now to FIG. 5, a passive radio frequency receiver and transmitter assembly may be used in place of the active microtransmitter circuit 400 shown in FIG. 4 in the electronics cavity 131 (FIGS. 1 & 2). It is used in connection with a normally open pressure sensor switch, such as pressure sensor 329 of FIG. 3A. The main component is a surface acoustic wave (SAW), tapped delay line (TDL) transmitter/receiver 501. The other component is an antenna 503. The antenna in this case is a sheet of foil 505 mounted to a piece of cardboard 507. The surface area of the foil antenna is determinative of its gain, and therefore should be maximized.

The SAW device acts like a transponder. It is excited by a pulsed radio frequency (RF) signal at a particular frequency received on its antenna 503. The received signal is delayed and processed by passive tapped delay line circuitry and is then re-radiated on the antenna 503. In effect, the SAW device echoes back or responds with an RF signal having known characteristics when interrogated by an RF signal having predetermined characteristics. No power is required or consumed by the device; it is entirely passive.

In the present application, the antenna 503 is connected to the RF input/output pin of the SAW device. The antenna is also connected by one of the two leads 201 to one of the contacts of pressure sensor 329. The other of the two leads 201 couples the metal package of the SAW device, which is ground, to the other contact in the pressure sensor 329.

When the contacts are closed in the pressure sensor 329 by normal tire pressure in a tire to which the integrated transmitter/sensor is attached, the antenna is grounded, thus disabling the SAW device. When the tire pressure falls to abnormal levels and opens the contacts in the pressure sensor 329, the SAW device is able to transmit or echo back. Alternatively, it is also possible to mount a SAW device directly on the diaphragm of a pressure sensor so that the diaphragm stresses this SAW device and thereby alters its response characteristics. The response characteristics of the SAW device thereby represent the tire pressure. Once calibrated to the actual tire pressure, the response characteristics of the SAW device become representative of the actual pressure sensed by the pressure sensor, thereby providing the ability, if desired, to monitor a continuous range of tire pressures.

SAW devices are manufactured by a number of different firms, such as RF Monolithits, Inc. of Dallas, Tex. and SAWTEK, Inc. of Orlando, Fla., and are available in a wide range operating frequencies. Generally, higher frequency devices are preferred, as they are smaller and require less antenna area. However, they are more expensive. Further, frequency of operation of these devices is governed by Federal Communications Commission regulations. For application in remote monitoring of tire pressure, the permitted frequency range of operation is 900 to 945 MHz. In this operating range, the size of the antenna 503 is preferred to be at least 1.25 square inches.

Figure 6:
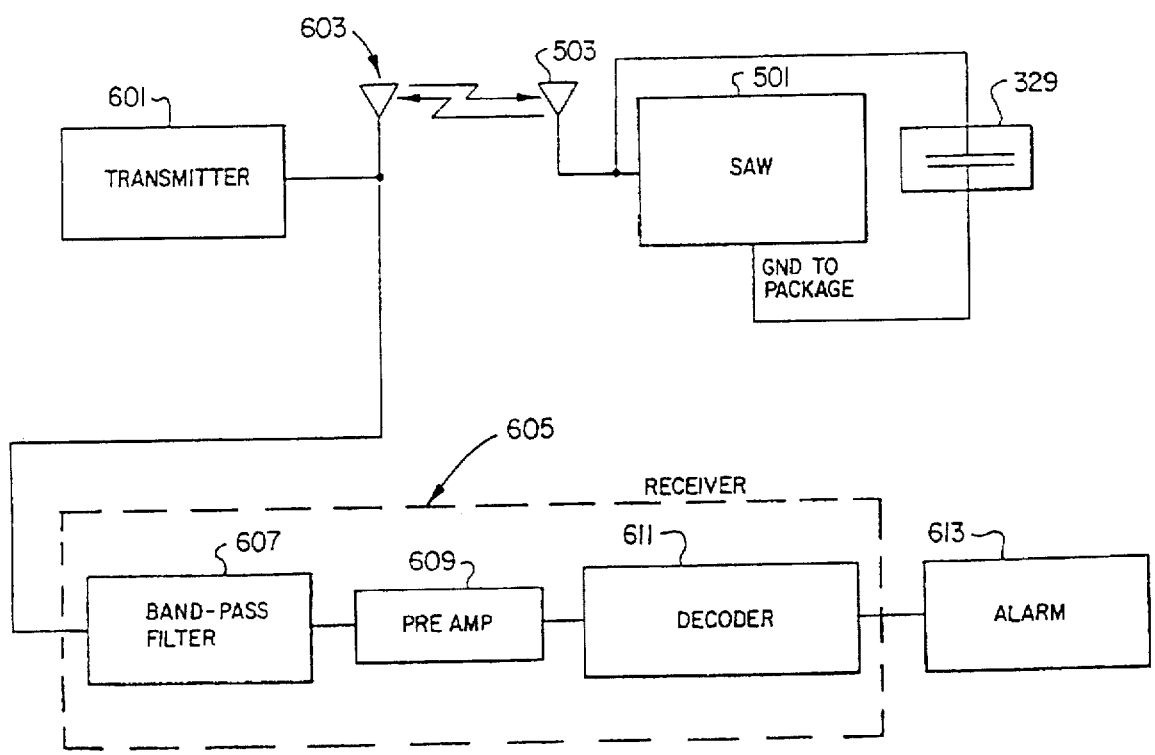
FIG. 6 is a schematic diagram of the transmitter and receiver circuits of the integrated sensor/transmitter assembly and of an on-board monitoring portion of the low tire pressure monitoring system.

Referring now to FIG. 6, a schematic diagram illustrates the electronic components of the tire pressure monitoring system using a passive transmitter, such as the SAW device 501, in the integrated sensor/transmitter 101. An RF transmitter 601 generates a pulsed RF signal at an operational frequency and having characteristics in accordance with those required for the SAW device 501 to respond. The pulsed RF signal is transmitted over an antenna 603. Antenna 603 is mounted within a wheel housing of a vehicle in close proximity to the wheel to which the integrated sensor/transmitter housing 101 (FIG. 1) holding the SAW device 501 is mounted.

Each transmission of the pulsed RF signal is part of a cycle that includes a "transmit" and a "listen" interval. The pulsed RF signal is transmitted during the "transmit" interval of the cycle. It is followed by a "listen" interval. Each cycle is periodically repeated sixty times a second in the preferred embodiment. Typically, the radiation pattern of pulsed RF signal will be narrowly shaped or focused and aimed at a hub of a wheel to provide an area of high gain through which the integrated sensor/transmitter assembly 101 (FIG. 1) passes as a tire to which it is mounted rotates. When radiated from a flat, planar antenna mounted in a wheel well it assumes a football shaped pattern. Sixty cycles per second ensures that an integrated sensor/transmitter assembly mounted on a wheel of a vehicle travelling at highway speeds will be within this high gain area for at least five cycles.

During the listen interval, the transmitter stands by and receiver 605 listens for a responding signal from SAW 501 on antenna 603. Signals received on antenna 603 and provided to receiver 605 are first filtered with band pass filter 607 and amplified with preamplifier 609 before being passed to decoder 611. The function of the decoder is to identify a signal originating from a SAW device. In its simplest form, identifying the signal requires detection of a signal having a frequency equal to that of a signal originating from the device and having a predetermined phase relationship with the pulsed RF signals from the transmitter. The receiver then provides to an alarm unit 613 mounted near a driver of a vehicle a signal indicating detection of a responding or echoing SAW, and the alarm unit either sounds an audible alarm or flashes a visual alarm, or both. Before providing the signal to alarm unit 613, the receiver confirms detection of a responding SAW by listening for and detecting a responding signal in each of a predetermined number of consecutive listen intervals.

Typically, more than one tire will be monitored in most systems. Receiver 605 listens for responses from any SAW device in integrated pressure sensor/transmitter assemblies mounted to the tires.

In more sophisticated systems having a multiple number of integrated pressure sensor/transmitter assemblies 101 (FIG. 1), each coupled to a tire stem of a separate tire, the signal echoed by the SAW device is, if desired, modulated with a predetermined binary cede. Which SAW is responding is then determined by the decoder demodulating the signal and looking up the binary code. The tire with abnormally low pressure is thereby identified. The receiver 605 then indicates with a signal to the alarm unit 613 the tire with the abnormal tire pressure. Though the decoder 611 looks up with the binary code which tire corresponds to the demodulated code, this could be handled by an alarm unit that looks up the tire from a table that has been programmed with the codes and the corresponding tires. In this case, where it is possible to identify which tire in a multiple-tire vehicle is transmitting, the pressure sensor switch 329 may be changed to a normally closed switch 129. The SAW thus responds when the tires are under normal pressure and fall to respond when the pressure drops below a predetermined value. A failure to relieve a response from a SAW indicates either low pressure or a failed pressure sensor and transmitter assembly.

An alternate method (not shown) for identifying uniquely which tire of a plurality of tires is suffering from abnormally low tire pressure is to poll and listen to each integrated sensor/transmitter separately. This can be done by selectively transmitting from each of a plurality of interrogating antennas 603, each focused on one or two integrated pressure sensor/transmitter assemblies in a time division multiplexed fashion. A switching circuit for selectively coupling the transmitter 601 and receiver 605 to a line going to each antenna 603 would be required. It is also conceivable that this may be done by utilizing SAW's responding to unique frequencies and stepping the frequency of the pulsed RF signal from transmitter 601 through the range of frequencies and listening after each step for a response.

Figure 7:
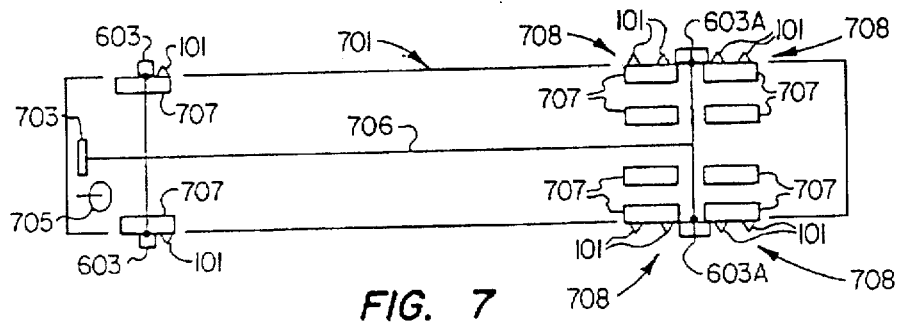
FIG. 7 is a schematic representation of a method of installing the low tire pressure monitoring system in a motorhome or bus.

Referring now to FIG. 7, a schematic representation of a motorhome or bus 701, the alarm unit 613, transmitter 601 and receiver 605 of FIG. 6, collectively represented by monitoring unit 703, are mounted near the driver, as represented by steering wheel 705. A coaxial cable 706 couples monitoring unit 703 to a plurality of antennas 603 and 603A mounted within each wheel well. Antenna 603 is a flat panel type, but it can be built with a slight radius to fit the curve of the wheel well. It is mounted at the top of single axle wheel wells so that it emits or broadcasts downwardly toward the hub of the wheel.

Each integrated sensor/transmitter assembly 101 is screwed onto the Shrader valve (not shown) of a stem of a tire 707. Please note that it is standard that tire stems for inside tires of a multiple tire axle are coupled to a reinforced air hose that is brought through the outside wheel and terminates at a Shrader valve connected to the outside wheel. Thus, the outside tires of the rear axles 708 have a pair of integrated sensor/transmitters, each connected to one of two Shrader valves (not shown).

Antenna 603 has a conical or football-shaped radiation pattern. This pattern delivers high gain in exchange for a narrower coverage area. Although it is desirable to have coverage over the entire path of rotation of an integrated sensor/transmitter 101, it is not necessary and it is more desirable to provide for high gain considering the relatively weak signals given off by SAW devices. It is sufficient that an integrated sensor/transmitter passes through the RF radiation at least twice during the rotation of the wheel, remaining, as previously indicated, within the radiation pattern for at least five consecutive transmit/listen cycles. Maximum gain occurs when an integrated sensor/transmitter assembly is closest to the antenna 603 during revolution of the tire.

Antenna 603A is comprised of two flat panel antennas. It is designed to be used in wheel housings for vehicles having two rear axles 708, each typically with two tires, such as motorhomes, buses and trailers. The two panels are secured to the top of the wheel well in a manner so as to form a shallow triangle, with the football-shaped radiation pattern of each of the antennas aimed separately toward (though not necessarily exactly at) the hub of the outer wheel of one of the two rear axles 708 in the wheel housing.

Figure 8:
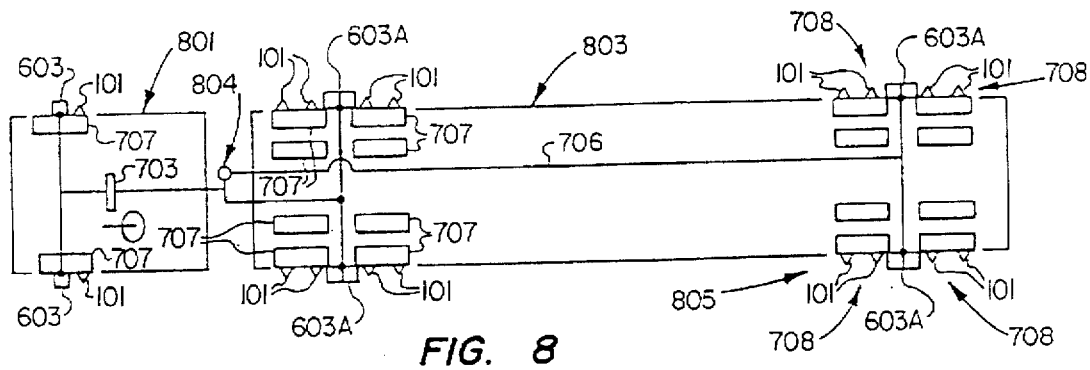
FIG. 8 is a schematic representation of a method of installing the low tire pressure monitoring system on a tractor-trailer combination.

Referring now to FIG. 8, a schematic representation of a tractor 801 and trailer 803 combination, the set up of the on-board monitoring unit 703, antennas 603 and 603A and the integrated sensor/transmitters 101 are installed on a tractor and trailer combination in the same manner they are installed on the bus or motorhome 701 (FIG. 7). However, because the trailer 803 will be disconnected from the tractor 801, the branch of coaxial cable 706 running to the antennas 603A in the rear 805 of the trailer is coupled through a disconnect coupling 804 to the monitoring unit 703 in the cab. For other towing arrangements, such as motorhomes towing boats or other vehicles, the low tire pressure monitoring system is installed in a like manner.

Figure 9:
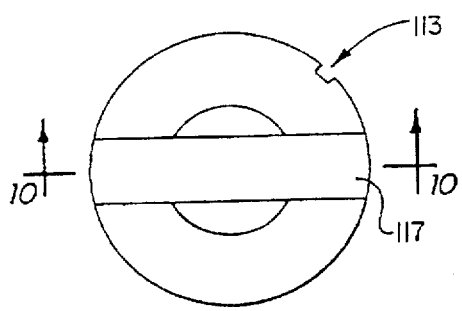
FIG. 9 is a top view of a brass insert coupler for connecting the integrated sensor/transmitter assembly to a Shrader valve of a tire stem.

Referring now to FIG. 9, shown is a top view of brass insert 113 of FIG. 1, illustrating the position of the tongue 117.

Figure 10:
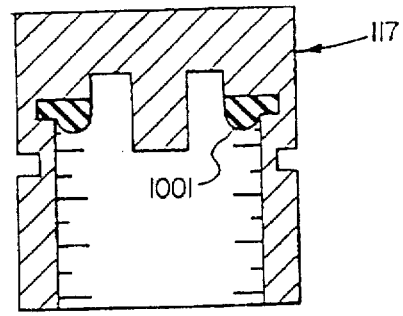
FIG. 10 is a cross-sectional side view taken along line 10—10 of FIG. 9.

Referring now to FIG. 10, a cross-section taken along section line 10—10 of FIG. 9, the brass insert is sealed against the top of a Shrader valve (not shown) with "O"-ring seal 1001 when screwed onto the Shrader valve. Tongue 117 extends downward to depress the valve core in the Shrader valve.

Figure 11:
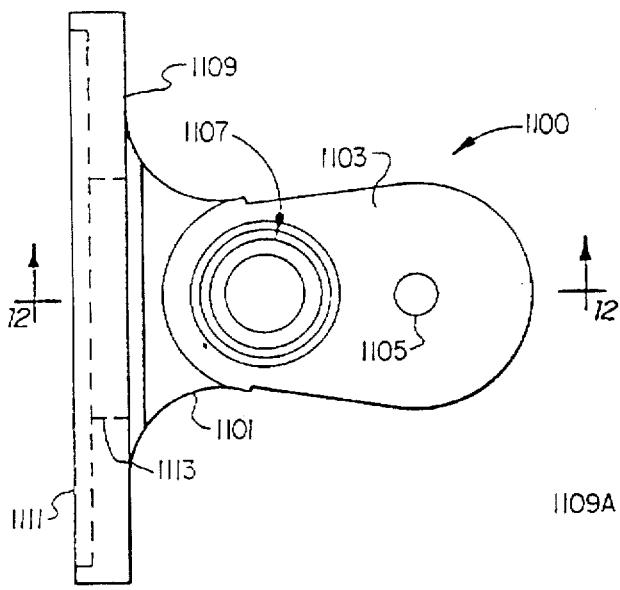
FIG. 11 is a top view of an alternate housing for the integrated sensor/transmitter assembly.

Referring now to FIG. 11, an alternate embodiment for a body 1101 and cover 1103 of an integrated transmitter/sensor assembly is used in place of the body 103 and cover 105 of integrated transmitter/sensor assembly 101 in FIG. 1. An opening 1105 is defined in the cover through which extends a push-to-test button (not shown) such as the push-to-test button 325 shown in FIG. 3 and push-to-test button 341 in FIG. 3A. Like the tire extension section 127 of body 103 (FIG. 1), body 1101 includes a tire stem extension 1107 section protruding, when assembled, through an opening in cover 1103. Note that, for purposes of illustration, a valve core assembly is not shown within the opening of the tire stem extension section.

Unlike that of the body 103 (FIG. 1), body 1101 has an integrally formed planar section 1109 for an electronics cavity in which are mounted an antenna 1111 (shown in phantom) and SAW device or microtransmitter 1113 (shown in phantom), as the case may be. The antenna 1111 is a rectangular piece of conductive foil mounted to cardboard, to which the RF input and output of the SAW or microtransmitter 1113 is coupled. When the integrated sensor and transmitter assembly 101 is mounted to a Shrader valve of a tire stem that is substantially parallel to the ground, this planar section 1109 of body 1101 properly orients the plane of the antenna 1111 so that it is parallel to the Shrader valve. With this orientation, the antenna is orthogonal twice during a revolution of a tire with respect to a line between the antenna 1111 and an antenna mounted near the wheel in a wheel housing, shown in FIGS. 7 and 8. Because the gain of the antenna 1111 is dependent on its area orthogonal to the direction of incidence of a radio frequency radiation, this body geometry maximizes the gain of the antenna 1111. Maximizing gain increases reliability. This is especially desirable if a SAW device is used as a transponder, as signals transmitted by it are relatively weak.

Figure 12:
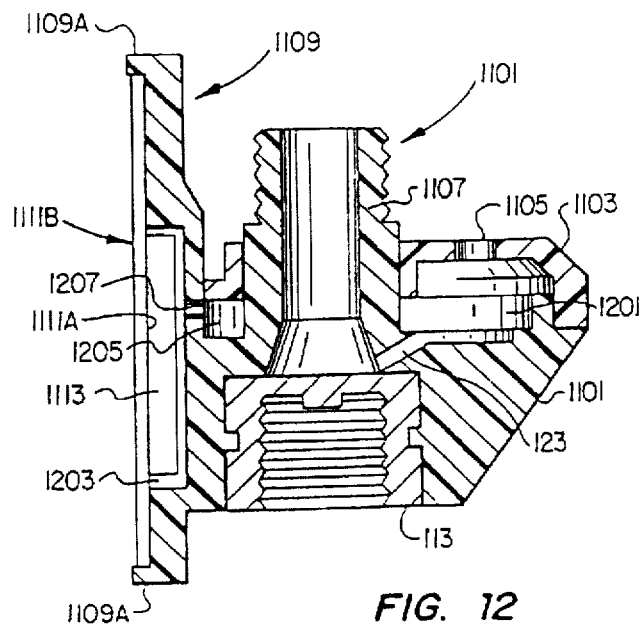
FIG. 12 is a cross-sectional side view taken along line 12—12 of FIG. 11.

Referring now to FIG. 12, a section taken along line 12—12 of FIG. 11 of the assembled body 1101 and cover 1103 reveal a cavity 1201 for receiving the pressure sensor assembly 129, shown in FIG. 3, or pressure sensor assembly 329 shown in FIG. 3A. The pressure sensor assembly is not shown for purposes of clarity. Like the body 103 (FIG. 1), body 1101 includes an air passage 123 for communicating air pressure to the pressure sensor assembly from the brass insert 113 that is screwed onto the tire stem. Tire stem extension section 1107 also includes a screw in valve core assembly such as valve core assembly 125 shown in FIG. 1. However, it too is not shown for clarity.

The planar antenna section 1109 of body 1101 is substantially square to allow antenna 1111 to have a large surface area. The antenna is made of a foil of conductive material 1111A that is mounted to the back side of a plastic antenna cover panel 1111B for protection against weather and other hazards. The antenna cover panel fits snugly between flanges 1109A of antenna section 1109 of body 1101 and is, if desired, fastened with an adhesive to the antenna section 1109 of body 1101.

A cavity 1203 is integrally formed in the antenna section 1109 to receive SAW device or microtransmitter 1113. Antenna cover 111 1B effectively seals this cavity against hazards. Though not shown, the RF input and output leads of the SAW device are connected to antenna 1111. Furthermore, the two leads 201 (FIGS. 2, 4 and 5) from either pressure sensor assembly 129 (FIG. 3) or 329 (FIG. 3A) when mounted in cavity 1201, are routed around tire stem 1107, first within cover 1103 and then down into a well 1205 integrally formed within base 1101. The leads then pass from well 1205 through a narrow passage 1207 to the SAW device or microtransmitter 1113.

An alternative embodiment of the low tire pressure monitoring system of the present invention which utilizes a hall effect sensor is illustrated in FIGS. 13A–B and indicated generally as 1300. A valve stem extension 1302 is illustrated schematically, but is analogous in design to the valve stem extension 101 illustrated in FIG. 1 in that it is adapted to screw onto an existing Shrader type valve stem and provide both a capillary air path for sensing the tire pressure and a second Shrader valve for normal tire operations (such as manually checking tire pressure and adding air to the tire). A small brass air line 1304 is attached to the valve stem extension 1302 and is open to the inside of the valve stem extension 1302. When the valve stem extension 1302 is attached to the tire valve stem, the pressure inside air line 1304, the valve stem extension 1302, the valve stem and the tire are equal.

The other end of the air line 1304 is attached to the inlet port 1305 of a pneumatic cylinder 1306 (see FIGS. 14A–B).

The cylinder contains a piston 1308 that is adapted to sealingly engage the walls of the pneumatic cylinder 1306 and slide longitudinally therein. The piston 1308 is carried by a rod 1310 that is adapted to sealingly engage an opening in an end wall of the pneumatic cylinder. The piston 1308 is coupled to an internal spring 1314 which biases the piston 1308 and piston rod 1310 to its full extension into the pneumatic cylinder 1306, as shown in FIG. 13B. Air pressure from the monitored tire appearing at the inlet port 1305 acts upon the piston 1308 and tends to extend the piston rod 1310 from the pneumatic cylinder 1306, thereby acting against the spring force and compressing the spring 1314. The piston 1308 will therefore move within the pneumatic cylinder with changing air pressures of the monitored tire.

A steel flag 1316 is attached to the piston rod 1310 by means of nuts 1318 and 1320. Steel flag 1316 is shaped so that it completely covers a south pole magnet 1322 when the piston 1308 is extended to a first predetermined point within the pneumatic cylinder 1306 (see FIG. 14B). The steel flag 1316 is shaped so that it covers the magnet 1322 half way when the piston 1308 is extended to a second predetermined point within the pneumatic cylinder 1306. Additionally, the steel flag 1316 is shaped so that it leaves the magnet 1322 completely uncovered when the piston 1308 is extended to a third predetermined point within the pneumatic cylinder 1306 (see FIG. 14A). The spring constant of spring 1314 is selected so that the piston 1308 will move to the first, second and third predetermined positions at known air pressures appearing at the inlet port 1305. Specifically, the spring 1314 is sized so that the piston 1308 will be located at the first predetermined point when a pressure that is below the minimum allowed pressure of the monitored tire is reached. The spring 1314 is also sized so that the piston 1308 will be located at the second predetermined point when a pressure that is equal to the minimum allowed pressure of the tire is reached. Finally, the spring 1314 is also sized so that the piston 1308 will be located at the third predetermined point when a pressure that is above the minimum allowed pressure of the tire is reached. In this way, the magnet 1322 is covered by the steel flag 1316 at all tire pressures below the preset minimum allowable pressure, halfway covered at the minimum allowable pressure, and uncovered above the minimum allowable pressure.

The steel flag 1316 will block the magnet flux from the magnet 1322 when it is covering the magnet. The magnet 1322 is situated in the device 1300 such that the south pole of the magnet 1322 is facing the cover 1324 of the device. When the steel flag 1316 is fully extended (as in FIG. 14A), magnetic flux from the south pole is present at the cover 1324 of the device. When the steel flag 1316 is fully retracted (as in FIG. 14B), most of the magnetic flux is blocked from reaching the front cover 1324 of the device 1300. When the magnet 1322 is half covered by the steel flag 1316, the level of magnetic flux present at the cover 1324 of the device 1300 is less than half of the level when the flag 1316 is fully extended.

The pneumatic cylinder 1306, the steel flag 1316 and the magnet 1322 are housed in an ABS plastic box 1326. The box 1326 is sealed with an ABS plastic cover 1324 to protect the contents and to seal out moisture and dirt.

Figure 15:
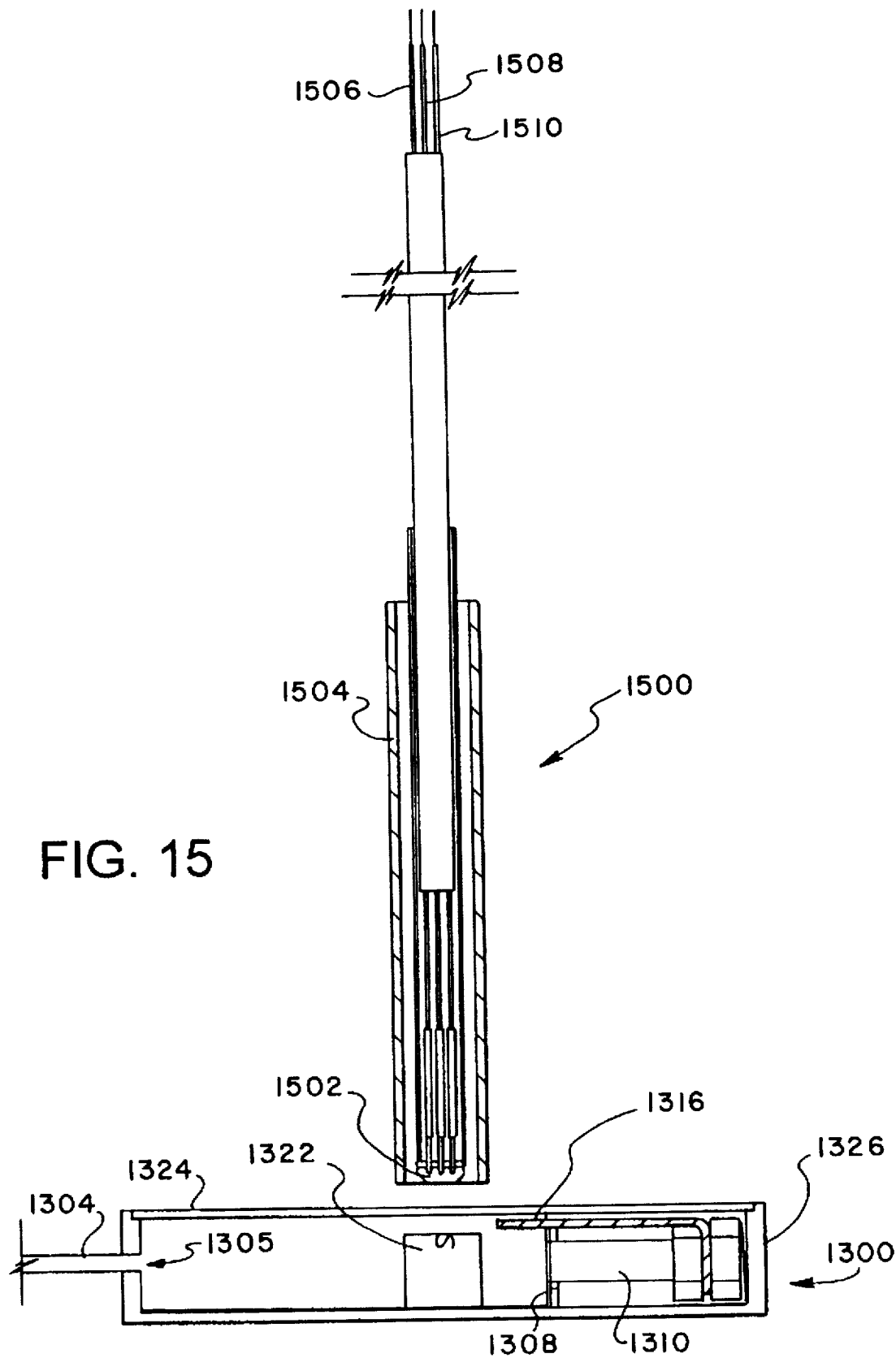
FIG. 15 is a cross-sectional side view of a hall effect sensor of the present invention and the device of FIGS. 13 and 14.

From the above, it will be appreciated by those skilled in the art that the pressure sensing device 1300 is adapted to produce differing amounts of magnetic flux near the cover 1324 in proportional relationship to the pressure of air within the tire to be monitored. In order to measure the amount of magnetic flux generated by the device 1300, a hall effect sensor assembly 1500 is provided, as illustrated in FIG. 15. The hall effect sensor assembly 1500 contains a hall effect sensor 1502 oriented parallel to the cover of the pressure sensing device 1300. The hall effect sensor 1502 is housed inside a metal tube 1504 which provides a rigid mounting and protection from dirt and moisture. Wires 1506 and 1508 provide power and ground for the sensor 1502 to operate electrically and a wire 1510 transmits the electrical signal from the sensor 1502 to the control box. The sensor 1502 and wires 1506–1510 are sealed inside the metal tube 1504 with epoxy resin in order to protect against dirt and moisture.

The hall effect sensor 1502 is preferably a unipolar south actuating current sinking sensor, such as SS443A manufactured by Honeywell Microswitch, Inc. Hall effect sensor 1502 will sense the presence of magnet flux from the south pole of magnet 1322. Specifically, when the magnet flux is present, the signal on wire 1510 from the sensor 1502 will be less than 0.5 VDC. When the magnet flux is not present, the signal on wire 1510 from the sensor 1502 will be approximately 5.0 VDC. The signal on wire 1510 will switch from 0.5 VDC to 5.0 VDC when the steel flag 1316 is covering approximately half of the magnet 1322.

In operation, as the pressure sensing device 1300 moves in a plane parallel to the face of the hall effect sensor 1502, the signal on wire 1510 from the hall effect sensor 1502 will begin at 5.0 VDC when the hall effect sensor 1502 is too far away from the magnet 1322 to sense any lines of magnetic flux. As the magnet 1322 of the pressure sensing device 1300 aligns with the hall effect sensor 1502, the signal on wire 1510 will change to 0.5 VDC if the pressure in the tire is sufficient to move the piston 1308 and hence the steel flag 1316 to a position which does not cover the magnet 1322. As the pressure sensing device 1300 then moves past the hall effect sensor 1502 such that the lines of magnetic flux from magnet 1322 can no longer be sensed by the sensor 1502, the output on wire 1510 returns to 5.0 VDC. If the pressure in the tire is insufficient to move the steel flag 1316 to a position which does not cover the magnet 1322, the signal from the hall effect sensor 1502 on wire 1510 would remain at 5.0 VDC as the sensor 1502 aligns with the magnet 1322 in the pressure sensing device 1300. In other words, an electrical pulse cycling between 5.0 VDC to 0.5 VDC to 5.0 VDC is produced when the air pressure in the tire is above the predetermined minimum allowable pressure. On the other hand, if the air pressure in the tire is below the predetermined minimum allowable pressure, the output on wire 1510 remains at a steady 5.0 VDC.

Figure 16:
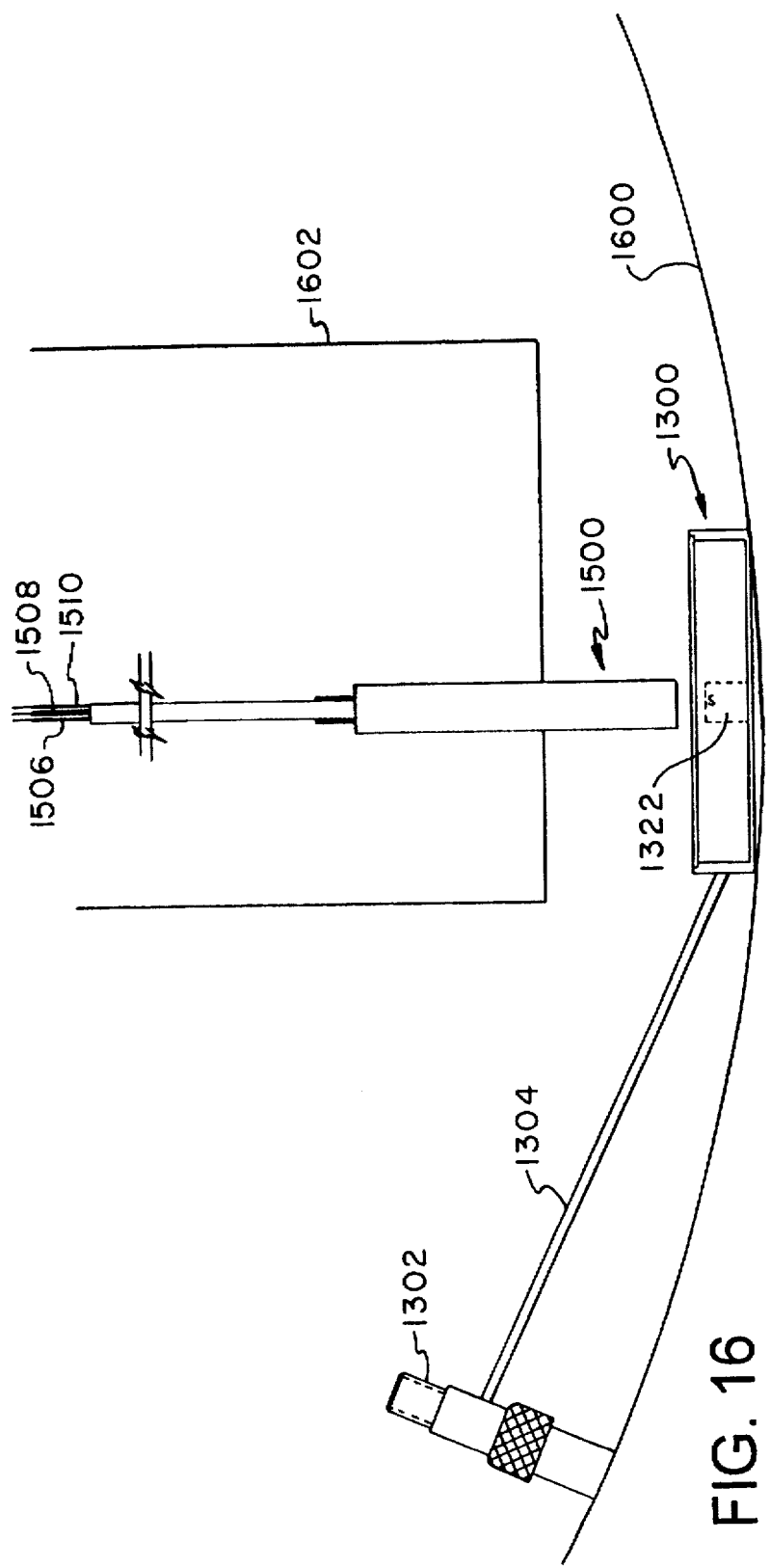
FIG. 16 is a schematic view of the device of FIG. 15 installed on a vehicle.

FIG. 16 illustrates how this principle is applied to sensing pressure in the tires of a vehicle. A pressure sensing device 1300 is attached to the inside rim 1600 of each wheel on the vehicle. The valve stem extension 1302 of each pressure sensing device 1300 is attached to the valve stem of each tire and thereby couples the tire pressure to the sensing device 1300 via air line 1304. The hall effect sensor 1500 is mounted to a fixed member 1602 of the chassis of the vehicle and is oriented so that it is aligned with the magnet 1322 of the pressure sensing device 1300 once with each revolution of the wheel. In other words, the hall effect sensor 1500 is mounted in a fixed position and the pressure sensing device 1300 rotates with the rim of the tire, thereby bringing the pressure sensing device 1300 and the hall effect sensor 1500 into alignment once each revolution of the tire. One hall effect sensor 1500 is mounted for each wheel of the vehicle. It will be appreciated by those skilled in the art that the valve stem extension 1302 is on the outside of wheel 1600 and the pressure sensing device 1300 is on the inside of wheel 1600, therefore there is sufficient clearance for the hall effect sensor 1500 over the pressure sensing device 1300 without interference from the valve stem extension 1302.

Figure 17A:
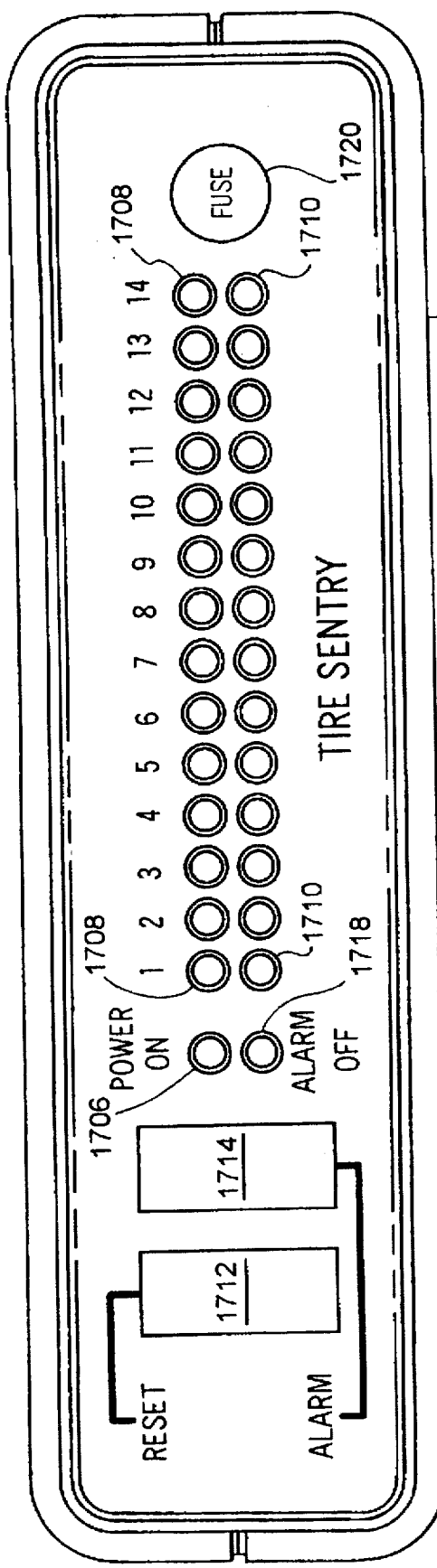
FIG. 17 is a diagram of two operator panels of the present invention.
Figure 17B:
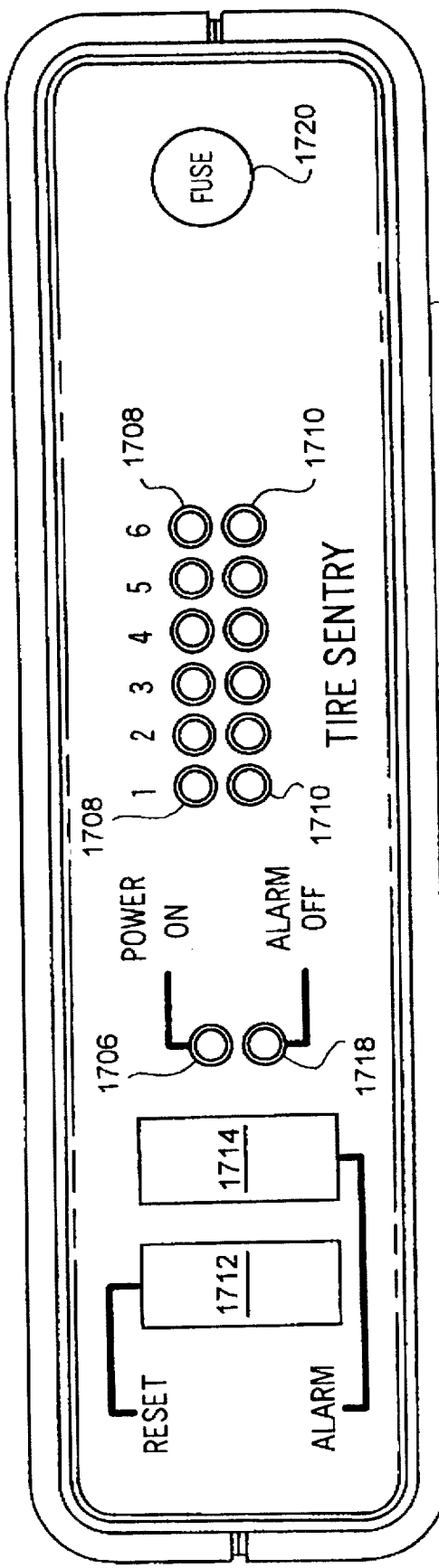

The hall effect sensor 1500 of each wheel on the vehicle is coupled via wire 1510 to a control box 1700 located inside the vehicle. Two embodiments of the control box operator panel are shown in FIG. 17. FIG. 17A illustrates a control box operator panel 1702 for use with a vehicle having 14 tires, while the operator panel 1704 of FIG. 17B is for a vehicle having 6 tires. It will be appreciated by those skilled in the art that a suitable operator panel may be designed for a vehicle having any number of axles and any number of wheels per axle. The operator panel includes a power on indicator LED 1706 which indicates that the electronics are coupled to an active power supply. A pressure OK indicator LED 1708 is included for each monitored tire which blinks one rime each rime the hall effect sensor 1500 passes the magnet 1322 in the pressure sensing device 1300 if the pressure is above the maximum low pressure level. A red pressure error indicator LED 1710 is provided for each monitored tire which is illuminated when the control box 1700 has determined that the tire pressure is below the minimum acceptable tire pressure. The LED 1710 remains on continuously until the low pressure condition is corrected and the reset button 1712 is pressed. The reset button 1712 is used by the operator to reset the electronics after an error condition has been corrected. An alarm on/off button 1714 is used to enable/disable the audible alarm in the control box 1700. An alarm off indicator LED 1718 indicates that the audible alarm has been disabled. A fuse holder 1720 and fuse (not shown) is provided to protect the electrical components of the control box 1700 in case of an electrical short or voltage surge.

Figure 18:
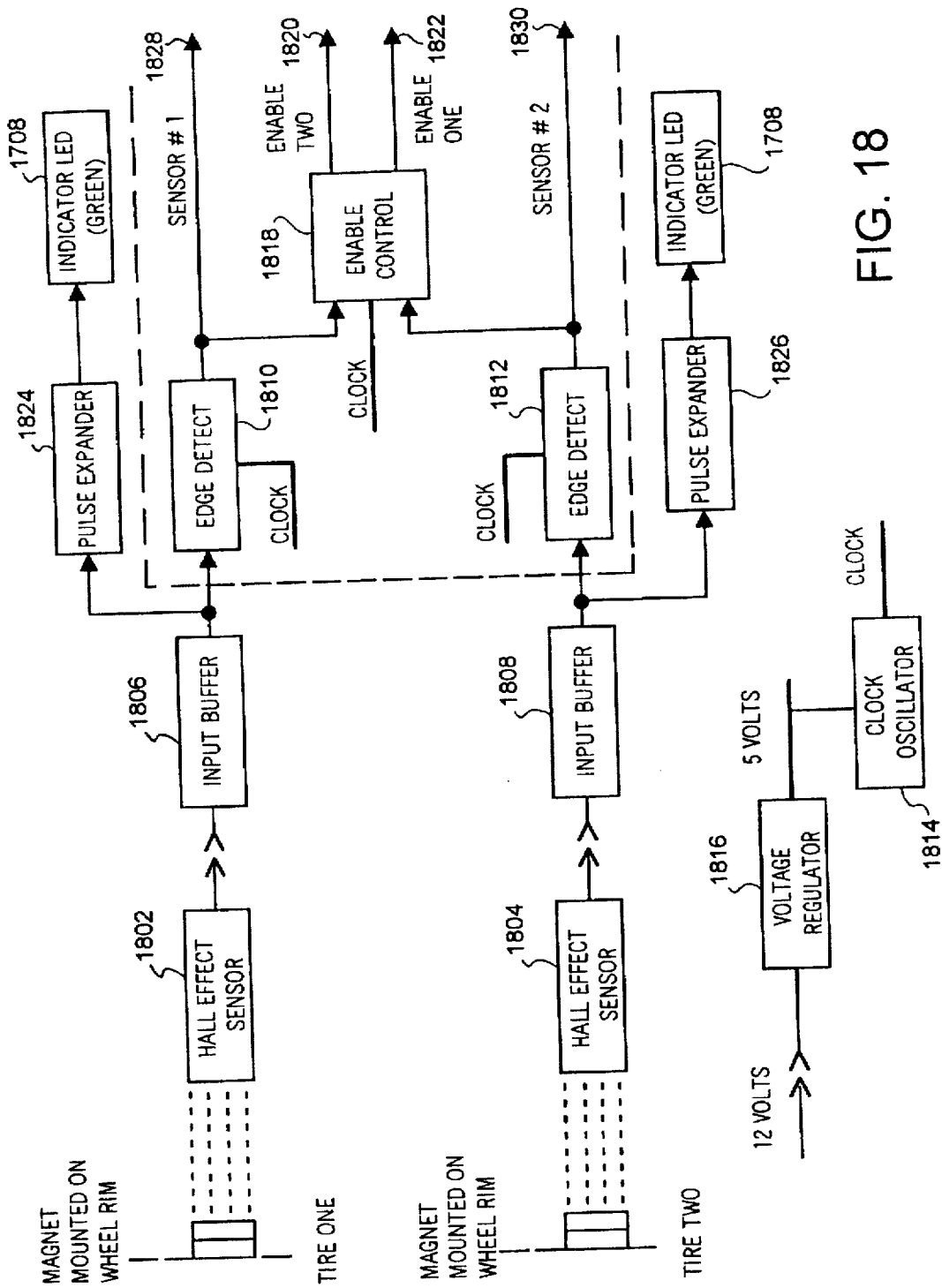
FIGS. 18 and 19 are a schematic block diagram of error detection electronics for the present invention.
Figure 19:
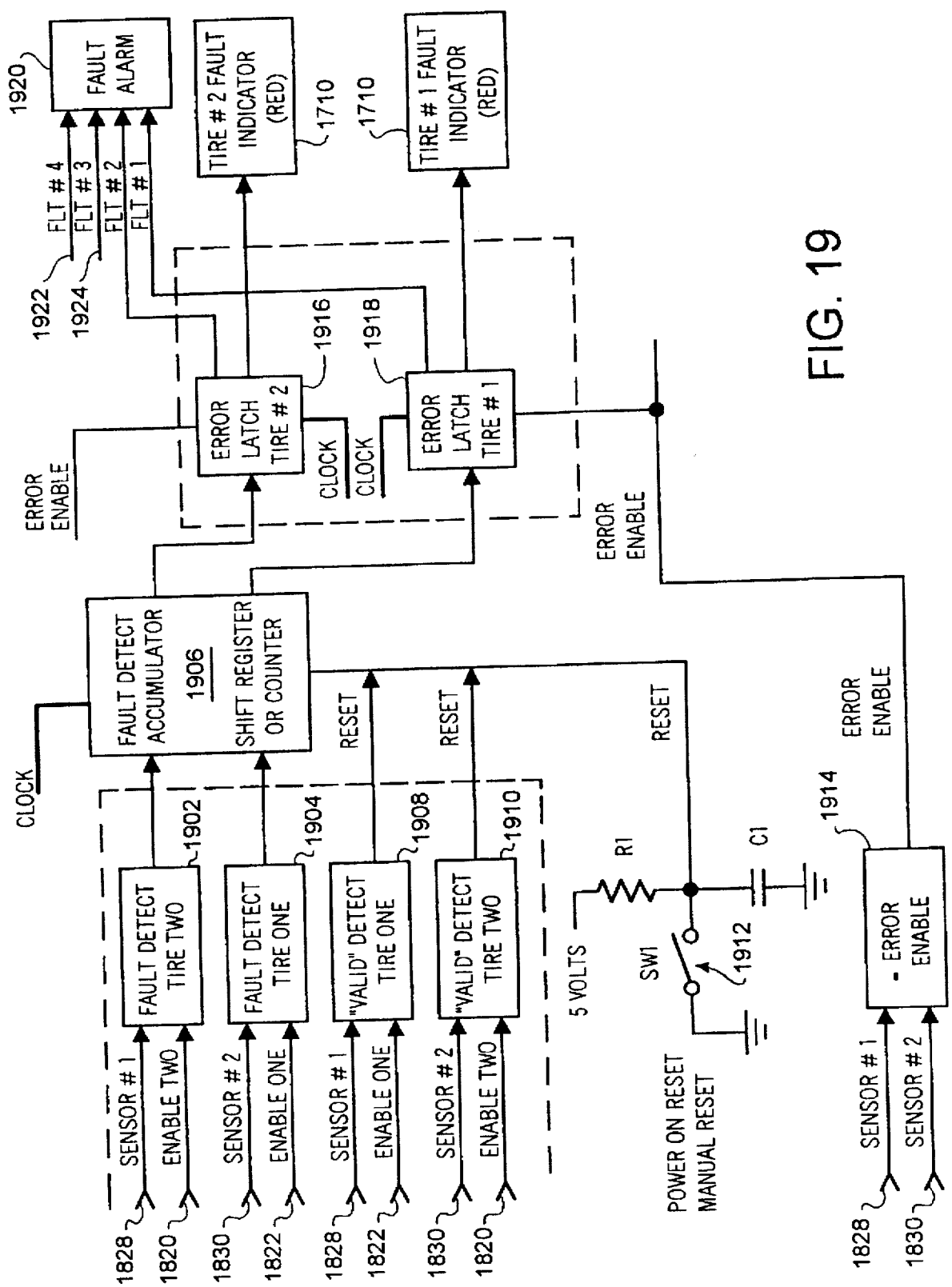

The electronic circuitry of control box 1700 is illustrated in schematic block diagram form in FIGS. 18 and 19. The block diagrams of FIGS. 18 and 19 are illustrative of a system employing two tire pressure sensors. It will be appreciated by those skilled in the art that analogous systems supporting a fewer or greater number of sensors may be easily constructed by analogy with reference to FIGS. 18 and 19. Referring now to FIG. 18, a first hall effect sensor 1802 is mounted to the chassis of the vehicle (1602) in the proximity of the rim of the wheel of tire one and a second hall effect sensor 1804 is mounted similarly near the rim of the wheel of tire two. The hall effect sensors 1802 and 1804 are of the design of sensor 1500 of FIG. 15. The output of hall effect sensors 1802 and 1804 is in the form of short pulses which coincide with the sensing of the corresponding pressure sensing device 1300 (mounted on the rim) during each revolution of the associated tire. This output is buffered by input buffers 1806 and 1808, respectively. The buffered outputs are input to respective edge detect circuits 1810 and 1812. The design of such edge detect circuits are well known in the art. The edge detect circuits 1810 and 1812 require a system clock input provided by clock oscillator 1814, preferably a model ICM 72421PA manufactured by Harris Semiconductor. 5 VDC power is supplied to all of the powered components from a voltage regulator 1816 coupled to the 12 VDC line from the vehicle's battery. Voltage regulator 1816 is preferably a model 78SR1-05-HC manufactured by Power Trends.

The outputs of buffers 1806 and 1808 are also input to pulse expander circuits 1824 and 1826, respectively, which are preferably a model SN74HC123 retriggerable multivibrators manufactured by National Semiconductor. Pulse expanders 1824 and 1826 operate to produce an output pulse upon the occurrence of each input pulse, however the output pulse has a uniform, longer period. The output of the pulse expanders 1824 and 1826 are coupled to green LED indicators 1708 on the control box operator panel 1702 or 1704 of FIG. 17. The pulse expanders 1824 and 1826 are required because the buffered outputs of the hall effect sensors 1802 and 1804 have relatively short duration pulse widths which may be too short to produce a visible "blink" of the indicator LEDs 1708.

The edge detect circuits 1810 and 1812 produce an output pulse having a duration of one clock period upon the detection of a transition in the buffered hall effect sensor output. The output pulses of edge detect circuits 1810 and 1812 appear on lines 1828 and 1830, respectively. The outputs of the edge detect circuits are also input to an enable control circuit 1818 which produces an output enable signal on line 1820 when a signal is received from tire one. Similarly, a second output enable signal 1822 is produced when a signal is received from tire two. Upon the receipt of this signal from tire two, the output enable signal on line 1820 is extinguished. This process repeats continuously as long as signals are received from the two tires.

The detection of a fault (i.e. a tire having pressure below the predetermined minimum allowed pressure) is accomplished by comparing the edge-detected signals from two different rims. If an edge-detected pulse is received from a first rim and is followed by an edge-detected pulse from the second tire, no error output is generated (normal operation). However, if an edge-detected pulse is received from the first tire and is not followed by an edge-detected pulse from the second fire, an error output is generated for each subsequent occurrence of the edge-detected output of the first fire. In other words, each tire should produce an output once during every revolution, therefore each sensor should produce an output before the other sensor produces a second output. In order to account for differences in the speed of rim rotation, such as during cornering or wheel spin, the error outputs are input to a counter and no alarm is given to the driver until a predetermined number of consecutive error outputs occur. The error counter is reset if the second sensor begins producing output pulses before reaching the predetermined number of missing pulses for an alarm. This function is implemented in the schematic block diagram circuit of FIG. 19.

Missing edge-detected pulses are detected by pulse comparators 1902 and 1904, which may be any of a wide variety of pulse comparators known in the art. Pulse comparator 1902 detects missing pulses from the sensor of tire one, while pulse comparator 1904 detects missing pulses from the sensor of tire two. The outputs of pulse comparators 1902 and 1904 are input to fault detect accumulator 1906 which may be any suitable counter or shift register, such as model 74HC164 manufactured by National Semiconductor. Fault detect accumulator 1906 functions to record the number of missing pulses detected for both tire one and tire two. This count is reset if the tire begins producing output pulses again before fault detect accumulator reaches its predetermined threshold count. Pulse comparators 1908 and 1910 are used to detect the occurrence of output pulses from the tire one sensor and the tire two sensor, respectively. The outputs of pulse comparators 1908 and 1910 are coupled to the reset of fault detect accumulator 1906. Fault detect accumulator is also reset by manual reset switch 1912 or the occurrence of a power on startup condition.

Error enable circuit 1914 prevents false error accumulation when the vehicle is stopped with one of the hall effect sensors 1802, 1804 directly over the magnet of it's respective fire. If the vehicle is rocked back and forth while stopped (as when maintaining position on an incline by repeatedly engaging the clutch of the vehicle for brief moments), one hall effect sensor (the one directly over its associated sensor) will continuously produce output pulses while the other does not, thereby accumulating false error conditions in the fault detect accumulator 1906.

When fault detect accumulator 1906 reaches a predetermined count for one of the tires, it produces an output to the appropriate error latch 1916 or 1918. Error latch 1916 and 1918 are operative to illuminate respective fault indicator LEDs 1710 on the control box operator panel 1702 or 1704. Error latches 1916 and 1918 also produce an output to the audible fault alarm 1920 which will produce an alarm that the driver of the vehicle can hear, so that he does not have to constantly monitor the LED indicators. Signal lines 1922 and 1924 are provided for connection to switch 1714 (see FIG. 17) to allow the driver to disable the audible alarm 1920.

It will be appreciated by those skilled in the art that because the present invention utilizes the comparison of two tire sensors in order to determine a fault, the circuitry of FIGS. 18 and 19 may be reproduced in any number of corresponding pairs to provide error detection for any number of tires on a given vehicle.

While the present invention has been described with a reference to a few specific embodiments, the description is made for the purposes of illustrating of the invention. It is not intended, nor should it be construed as limiting, the invention. Various modifications may occur to those skilled in the art without departing from the true scope and spirit of the invention as set forth by the appended claims.

What is claimed is:

1. A wireless monitoring system for indicating the occurrence of a predefined condition with a transducer to which wires and other physical connections cannot be easily made, the monitoring system comprising:

transducer means for sensing an occurrence of a predefined condition, said transducer means comprising (a) a pressure chamber coupled to a source of pressure to be monitored, (b) a piston slidingly engaged in said pressure chamber and operable to move within said pressure chamber in response to increasing pressure from said source, (c) a rod having a first end coupled to one side of said piston, said rod sealingly engaged with said pressure chamber and operable to extend into and out of said pressure chamber, and (d) biasing means coupled to a second end of said rod and operable to extend said rod into said pressure chamber when a biasing force of said biasing means is greater than a force of said piston created by said pressure from said source of pressure;

means for selectively producing a magnetic field coupled to said transducer and operable to emit a magnetic field when said transducer is in a first state and further operable to not emit a magnetic field when said transducer is in a second state; and means for sensing a magnetic field positioned so as to be in at least occasional proximity to said means for selectively producing a magnetic field, said means for sensing a magnetic field producing an output only when said magnetic field is present.

2. The wireless monitoring system of claim 1, further comprising:

indicator means coupled to said output and operable to indicate said occurrence of said predefined condition based upon said output.

3. The wireless monitoring system of claim 1 wherein said means for selectively producing a magnetic field comprises:

a permanent magnet; and magnet shield means operable to selectively deflect said magnetic field away from said means for sensing a magnetic field when said transducer is in said second state and to leave said magnetic field substantially unaffected when said transducer is in said first state.

4. The wireless monitoring system of claim 1 wherein said means for sensing a magnetic field comprises a Hall effect sensor.

5. The wireless monitoring system of claim 1 wherein said transducer means and said means for selectively producing a magnetic field are mounted to a rotating object.

6. The wireless monitoring system of claim 5 wherein said rotating object is a wheel and tire combination, and said predefined condition is an occurrence of air pressure within said tire falling below a predetermined level.

7. The wireless monitoring system of claim 6 wherein said means for sensing a magnetic field is mounted at a fixed position such that said means for sensing a magnetic field is in substantially close proximity to said means for producing a magnetic field at least once during each revolution of said wheel and tire combination.

8. A tire pressure monitoring system for warning a driver of a vehicle when pressure in a tire falls below a predetermined pressure level, comprising:

a pressure chamber having a pneumatic inlet;

means for mechanically securing said pressure chamber to an inside rim of a wheel carrying said tire and mounted to an axle of said vehicle, said means for mechanically securing including air passage means for communicating pneumatic pressure from a stem of said tire to said pneumatic inlet;

a piston slidingly engaged in said pressure and operable to move within said pressure chamber in response to an increase of said pneumatic pressure;

a rod having a first end coupled to one side of said piston, said rod sealingly engaged with said pressure chamber and operable to extend into and out of said pressure chamber;

biasing means coupled to a second end of said rod and operable to extend said rod into said pressure chamber when a biasing force of said biasing means is greater than a force on said piston created by said pneumatic pressure;

a permanent magnet disposed in proximity to said pressure chamber; said magnet producing a magnetic field;

a Hall effect sensor mounted on said axle and operable to sense said magnetic field and produce an output when said permanent magnet is in substantially close proximity thereto;

magnetic shield means coupled to said rod and operable to selectively deflect said magnetic field away from said Hall effect sensor when said pneumatic pressure is below said predetermined pressure and to leave said magnetic field substantially unaffected when said pneumatic pressure is above said predetermined pressure; and indicator means operable to alert said driver based upon said output.

* * * * *